United States Patent [19]

Cooper et al.

[11] Patent Number: 4,598,465
[45] Date of Patent: Jul. 8, 1986

[54] METHOD FOR FABRICATING COUPLED CAVITY TRAVELLING WAVE TUBES

[75] Inventors: Brian F. Cooper, Chelmsford; David H. Cottey, East Hanningfield, both of England

[73] Assignee: English Electric Valve Company, Chelmsford, England

[21] Appl. No.: 539,146

[22] Filed: Oct. 5, 1983

[30] Foreign Application Priority Data

Oct. 6, 1982 [GB] United Kingdom ............ 8228613

[51] Int. Cl.⁴ .................................................. H01P 11/00
[52] U.S. Cl. .......................................... 29/600; 29/464; 29/DIG. 4; 315/3.5
[58] Field of Search ........... 29/600, 464, 467, DIG. 4; 315/3.5, 3.6, 39.51, 39.73, 39.75, 39.77

[56] References Cited

U.S. PATENT DOCUMENTS 3,678,575  7/1972  Akeyama et al. ............ 29/600
4,129,803 12/1978  Friz ................................ 29/600

FOREIGN PATENT DOCUMENTS 2128110  4/1984  United Kingdom ............ 29/600
2128111  4/1984  United Kingdom ............ 29/600

OTHER PUBLICATIONS

"Waveguide Components," by D. J. Doughty, *Journal Brit. I.R.E.*, (Feb. 1961) pp. 169, 176, 177, 179.
"How Cold Hobbing Shapes Intricate Parts" by Alex Phillips, *The Iron Age* (Apr. 3, 1958) pp. 91-93.

*Primary Examiner*—Howard N. Goldberg
*Assistant Examiner*—R. S. Wallace
*Attorney, Agent, or Firm*—Spencer & Frank

[57] ABSTRACT

A millimeter coupled cavity travelling wave tube has its slow wave structures formed by a hobbing process. In a preferred construction, each slow wave structure is made of two individual halves each extending for the length of the structure. Each half contains one half of each cavity and one half of each beam hole and all of the portions of cavity and portions of beam hole in each half are formed in one hobbing operating. Coupling holes between cavities are formed where required by a process (e.g. spark erosion) separate from hobbing and if ferrules or drift tubes are required to extend out of the cavity separating walls in the finished tube, the beam coupling holes are made oversized and individual ferrules are brazed into position. The two halves of the slow wave structure are united by furnace brazing.

17 Claims, 8 Drawing Figures

METHOD FOR FABRICATING COUPLED CAVITY TRAVELLING WAVE TUBES

BACKGROUND OF THE INVENTION

This invention relates to coupled cavity travelling wave tubes and in particular, though not exclusively, to millimeter coupled cavity travelling wave tubes, that is to say travelling wave tubes for operation at a frequency in the region of 35 GHz and up to and beyond 95 GHz.

A typical coupled cavity travelling wave tube as at present known is illustrated in FIGS. 1 and 2 of the accompanying drawing of which, FIG. 1 is a longitudinal section through part of the slow wave structure of the tube, and FIG. 2 shows the slow wave structure in cross-section along the line A..A of FIG. 1.

Referring to FIGS. 1 and 2, the slow wave structure consists of a series of cylindrical cavities 1, of constant height. In each of the walls 2 separating one of the cavities 1 from another is an arcuate coupling slot 3, 4 of which the slots 3 in alternate ones of the walls 2 are staggered relative to the slots 4 in the remaining ones of the walls 2. Coupling slots 3, 4 provide for radio frequency (R.F.) coupling between the cavities 1.

In the centre of each of the walls 2 is provided an axially aligned drift tube or ferrule 5 through which, in operation, the electron beam passes down the length of the slow wave structure from an electron gun (not shown) to a collector (not shown).

The dimensions and positions of the drift tubes 5 influence both bandwidth and efficiency.

The method of construction normally employed to construct the slow wave structure illustrated in FIGS. 1 and 2 is as follows.

The slow wave structure is made up of sections each of which comprises a wall 2, a coupling slot 3 or 4, a drift tube 5 and a short length of the cylindrical wall 6 of the slow wave structure. Each section is blanked out and then machined to achieve the final dimensions.

The complete structure is then built up by stacking one section upon the next together with brazing wire or foil suitably placed in between.

The whole assembly is then jigged for alignment and furnace brazed.

Whilst such methods of assembly are very satisfactory for coupled cavity travelling wave tubes for operation below millimeter frequencies, it is believed that if applied to millimeter coupled cavity travelling wave tubes difficulties would be experienced due to the extremely small tolerances which would be permitted in the dimensioning and assembly of the slow wave structure of such tubes. It will be appreciated that in a millimeter coupled cavity travelling wave tube, the overall dimensions of each cavity in the slow wave structure are very small and in each tube typically three slow wave structures may be required each containing up to thirty cavities. It is estimated that for consistent performance, particularly for a tube operating in the region of 95 GHz, dimensional and assembly tolerances of the order of 0.0001" (one ten thousandth of an inch or in other words 0.00254 mm) are required.

Tolerances of this order cannot be achieved by conventional machines under normal workshop conditions. To carry out the machining of the individual sections as hereinbefore described in the quantities which would be required for normal production, would require high precision lathes and control equipment, of the type used for the diamond turning of optical components, operated in a closely controlled environment. For production purposes, providing such machining is considered to be impracticable and even if it were not the yield of good sections would likely be low.

Even with individual sections machined within tolerance, building up the complete structure by stacking the individual sections militates against the maintenance of dimensional tolerances during brazing.

Associated with the problems of manufacture outlined above are difficulties relating to inspection, measurement and handling.

SUMMARY OF THE INVENTION

One object of the present invention is to provide an improved method of manufacturing a coupled cavity travelling wave tube, and in particular the slow wave structure thereof, in which one or more of the above difficulties is reduced or avoided.

According to this invention in its broadest aspect, a method of constructing a coupled cavity travelling wave tube is provided wherein at least part of a slow wave structure therefor is formed by a hobbing process.

According to a feature of this invention, a method of constructing a coupled cavity travelling wave tube is provided wherein a slow wave structure therefor is formed of two or more individual sections each made, at least in part, by a hobbing process and united thereafter.

In one example of construction in accordance with the present invention each individual section has an axial length extending over part of the combined axial lengths of a cavity and one end wall thereof separating that cavity from the next, said section being hobbed in an axial direction ending with said separating end wall.

Preferably said part of the axial length of a cavity is the whole of the axial length of a cavity.

Said construction may be such as to produce assymetric ferrules or drift tubes, in each individual section a drift tube being provided to extend out of the end wall thereof only on the side of said end wall facing the cavity over the axial length, or over part of the axial length, of which the axial length of said individual section extends.

In another construction in accordance with the present invention, there is no ferrule projecting from the end wall thereof, the drift tube being wholly contained within said wall.

In this last mentioned case in particular the beam hole required in the drift tube may be formed in one with the cavity as part of the one hobbing operation. In other cases said beam hole may be formed as a process separate from the hobbing process, for example, by spark erosion or conventional machining.

Normally the outer periphery of each individual section will be machined as a separate process.

In a preferred construction in accordance with the present invention said individual sections have axial lengths equal to the axial length of a slow wave structure, parts of all of the cavities in said structure being formed at one time by hobbing.

Preferably there are two and two only individual sections to a slow wave structure, each constituting one axially extending half of the structure.

Preferably in each individual section, part of each cavity and part of each beam coupling hole are formed by hobbing.

Preferably said construction provides for no ferrules or drift tubes to extend out of the walls separating one cavity from another. Where ferrules or drift tubes are required to extend out of the cavity separating walls, said beam holes are preferably made oversized and individual ferrules or drift tubes are brazed or otherwise fixed into said oversized beam holes.

Preferably coupling holes required in cavity separating walls are formed in appropriate ones of the part separating walls formed by hobbing in each individual section by a process separate from hobbing such as conventional machining or spark erosion.

Normally in all cases the individual sections are united by furnace brazing.

Preferably the coupled cavity travelling wave tube constructed is a millimeter coupled cavity travelling wave tube.

BRIEF DESCRIPTION OF THE DRAWINGS

In FIGS. 3 to 8 corresponding numbers are used as references to corresponding parts in FIGS. 1 and 2.

DESCRIPTION OF THE PREFERRED EMBODIMENTS

Figure 2:
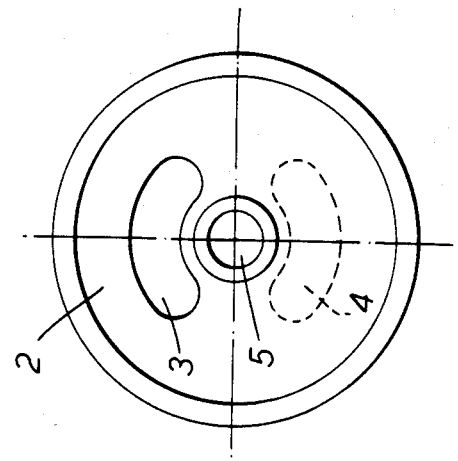
FIG. 2 shows the slow wave structure of FIG. 1 in cross-section along the line A..A of FIG. 1.
Figure 1:
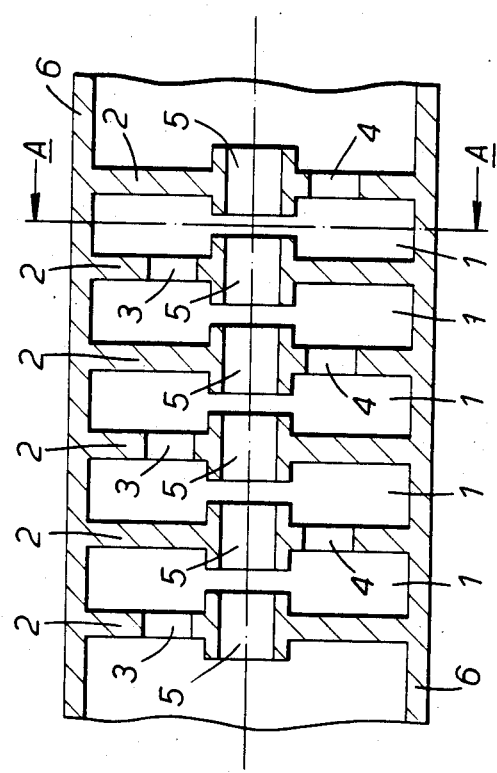
FIG. 1 is a longitudinal section through part of the slow wave structure of a typical coupled cavity travelling wave tube.
Figure 4:
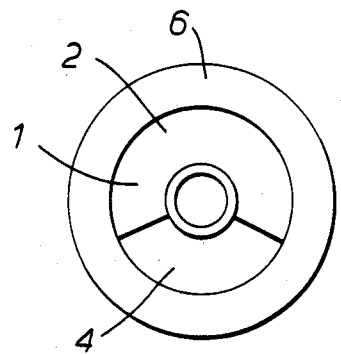
FIG. 4 is a view of the individual section of FIG. 3 in the direction of the arrow 7.
Figure 3:
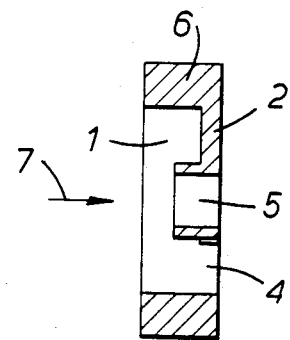
FIG. 3 is a longitudinal section through one individual section of slow wave structure in a coupled cavity travelling wave tube made in accordance with the present invention.

Referring to FIGS. 3 and 4, in this example each slow wave structure in the travelling wave tube is made up of individual sections stacked and furnace brazed as described with reference to FIGS. 1 and 2. However instead of each individual section being formed as a blank and then machined to the required dimensions, in this case each individual section is made by hobbing.

The technique of hobbing is known per se and resides in pressing a male master form, or in other words a body of shape the reverse of that required, into a relatively soft material e.g. annealed copper.

In making the male master form a blank of hardened tool steel is ground into the required shape under carefully controlled conditions to achieve the desired accuracy. In practive it has been found that accuracies of the desired order and indeed higher can be achieved in making the master form.

In use, wear may be expected to be isignificant throughout the life of the master form which will normally fail due to fracture eventually after possibly several hundreds of hobbing operations. Thus throughout the life of the master form shapes may be expected to be reproduced repeatedly with a high degree of accuracy.

In the case of FIGS. 3 and 4, each individual section is made with an assymetrical ferrule or drift tube 5, that is to say each drift tube 5 projects into one cavity 1 only and not into two adjacent cavities. It is presently considered that a shape such as would be required to reproduce a symetrical drift tube form as in FIGS. 1 and 2 would be too complex to be achieved by hobbing.

In FIGS. 3 and 4 the shape which is produced by a single hobbing operation in the direction of the arrow 7 is that indicated in profile in FIG. 3 by the heavy black lines, that is to say all of the internal features excepting the beam hole in the drift tube. The beam hole in the drift tube and the outer diameter of the outer cylindrical wall 6 would be machined later.

Figure 6:
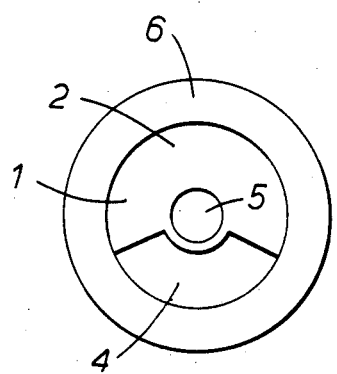
FIG. 6 is a view of the individual section of FIG. 5 in the direction of arrow 8.
Figure 5:
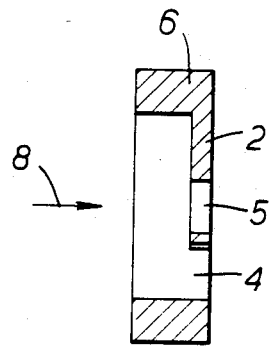
FIG. 5 is a longitudinal section through one individual section of slow wave structure in another coupled cavity travelling wave tube made in accordance with the present invention.

Referring to FIGS. 5 and 6, in this case the construction of the coupled cavity travelling wave tube is essentially similar to that already described with reference to FIGS. 3 and 4. In this case however the shape is further simplified by there being no projecting ferrule or drift tube, the drift tube 5 being contained wholly within the separating wall 2. By virtue of this simplification the beam hole is also arranged to be made in one hobbing operation. The outer diameter of the outer cylindrical wall 6 is, as with FIGS. 3 and 4, machined separately.

The improvement to be expected in employing a construction as described with reference to FIGS. 3 and 4 or FIGS. 5 and 6 as compared to the construction described with reference to FIGS. 1 and 2 resides in the relative ease with which each individual section may be fromed with a relatively high degree of accuracy. However the individual sections are still assembled and united as previously and the problems associated with this aspect are still inherent. For this reason, the construction now to be described with reference to FIGS. 7 and 8 is preferred.

Figure 8:
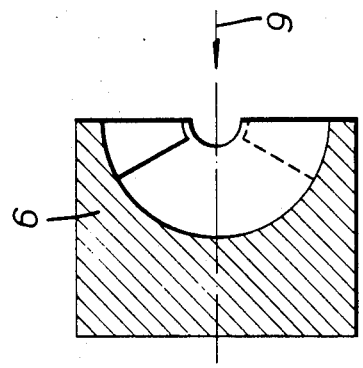
FIG. 8 shows the structure of FIG. 7 in cross-section along the lines B..B in FIG. 7.
Figure 7:
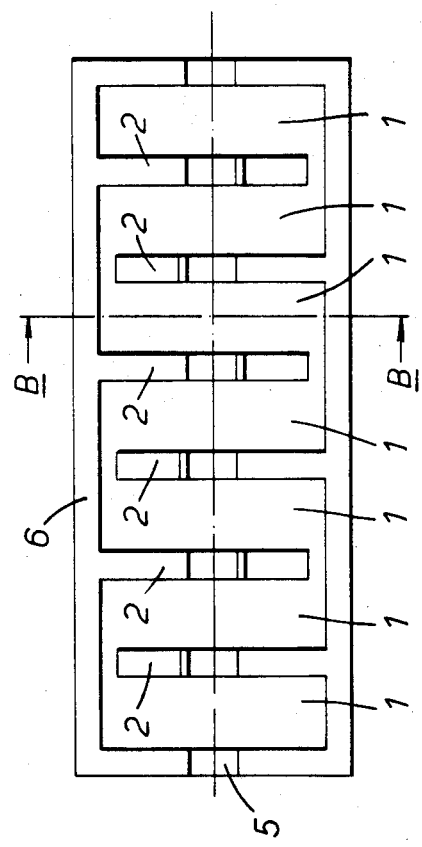
FIG. 7 is a longitudinal section through part of one slow wave structure of another coupled cavity travelling wave tube made in accordance with the present invention.

Referring to FIGS. 7 and 8, in order to reduce the number of components which require to be assembled and united by brazing to form the slow wave structure, this last-mentioned is formed in two similar halves each comprising a longitudinally extending section of the structure. The number of cavities shown is only representative of course.

Two billets of annealed copper are hobbed to provide the shape shown in heavy outline in FIG. 8.

Hobbing takes place into the plane of the paper in the case of FIG. 7 and in the direction of the arrow 9 in the case of FIG. 8. All of the portions of cavities and portions of beam hole in each billet are formed in one hobbing operation.

Thus, in each cavity position, one half of the cavity 1 and one half of each beam hole in a separating wall 2 is formed by hobbing. As with the example shown in FIGS. 5 and 6 there are no projecting ferrules or drift tubes, the drift tube 5 in each case being contained wholly within the separating wall 2.

Before the two halves of the slow wave structure are united by furnace brazing staggered coupling slots are formed in the separating walls 2 by a separate process such as spark erosion or conventional machining.

Whilst not illustrated, if projecting ferrules or drift tubes are required the beam holes formed by hobbing may be oversized and individual drift tubes of the required length brazed into position.

We claim:

1. A method of constructing a coupled cavity travelling wave tube having a slow wave structure with a plurality of walls that are spaced apart to provide a plurality of cavities in a row, each wall having a centrally disposed beam opening that is aligned with the other beam openings so that the centers of the beam openings are disposed along a line, comprising:

forming a plurality of individual sections for said slow wave structure, each section having an axis that is parallel to said line and being made at least in part by hobbing at right angles to said axis, wherein said individual sections have axial lengths equal to the axial length of a slow wave structure, parts of all of the cavities in said structure being included in each section and being formed at one time by hobbing; and uniting said sections.

2. A method as claimed in claim 1 and wherein the

3. A method as claimed in claim 1 and wherein there are two and two only individual sections to a slow wave structure, each constituting one axially extending half of the structure.

4. A method as claimed in claim 1 and wherein in each individual section, part of each cavity and part of each beam coupling hole are formed by hobbing.

5. A method as claimed in claim 1 and wherein said construction provides for no ferrules or drift tubes to extend out of the walls separating one cavity from another.

6. A method as claimed in claim 1 and wherein ferrules or drift tubes are required to extend out of the cavity separating walls, said beam holes being made oversized and individual ferrules or drift tubes being brazed or otherwise fixed into said oversized beam holes.

7. A method as claimed in claim 1 and wherein coupling holes required in cavity separating walls are formed in appropriate ones of the part separating walls formed by hobbing in each individual section by a process separate from hobbing.

8. A method as claimed in claim 1 and wherein the individual sections are united by furnace brazing.

9. A method of constructing a coupled cavity travelling wave tube having a slow wave structure with an axis, said slow wave structure including a plurality of walls which extend perpendicular to said axis at spaced-apart positions and which separate a plurality of disk-shaped cavities disposed along said axis, said walls having disk-shaped beam openings therein which are disposed along said axis and which communicate between adjacent cavities, comprising the steps of:

forming a first section having at least a portion of each wall, cavity, and beam opening by hobbing a first metal billet using a male master form that is pressed into said first billet at right angles to said axis;

forming a second section having at least a portion of each wall, cavity, and beam opening by hobbing a second metal billet using a male master form that is pressed into said second billet at right angles to said axis; and uniting said first and second sections at a single joint between the sections.

10. A method as claimed in claim 11, further comprising the step of forming coupling openings in said walls after said billets are hobbed.

11. A method as claimed in claim 10, further comprising affixing ferrules to said walls at said beam openings.

12. A method as claimed in claim 10, wherein said uniting step is conducted by furnace brazing.

13. A method of constructing a coupled cavity travelling wave tube having a slow wave structure with an axis, said slow wave structure including a plurality of walls which extend perpendicular to said axis at spaced-apart positions and which separate a plurality of cavities disposed along said axis, said walls having beam openings therein which are disposed along said axis and which communicate between adjacent cavities, comprising the steps of:

forming a first section having at least a portion of each wall and cavity by hobbing a first metal billet using a male master form that is pressed into said first billet at right angles to said axis;

forming a second section having at least a portion of each wall and cavity by hobbing a second metal billet using a male master form that is pressed into said second billet at right angles to said axis; and uniting said first and second sections at a single joint between the sections.

14. a methos as claimed in claim 13, further comprising the step of forming coupling openings in said walls after said billets are hobbed.

15. A method as claimed in claim 14, further comprising affixing ferrules to said walls at said beam openings.

16. A method as claimed in claim 14, wherein said uniting step is conducted by furnace brazing.

17. A method as claimed in claim 13, wherein the step of forming a first section further comprises forming at least a portion of each beam opening by hobbing, and wherein the step of forming a second section further comprises forming at least a portion of each beam opening by hobbing.

* * * * *